United States Patent [19]

Tamai

[11] Patent Number: 5,477,124
[45] Date of Patent: Dec. 19, 1995

[54] CIRCUIT TO PREVENT EXCESSIVE RECHARGEABLE BATTERY DISCHARGE

[75] Inventor: Mikitaka Tamai, Sumoto, Japan

[73] Assignee: Sanyo Electric Co., Ltd., Osaka, Japan

[21] Appl. No.: 285,512

[22] Filed: Aug. 4, 1994

[30] Foreign Application Priority Data

Aug. 20, 1993 [JP] Japan .................. 5-206384

[51] Int. Cl.$^6$ .................................. H01M 10/44
[52] U.S. Cl. .................. 320/13; 320/14; 320/39; 320/40
[58] Field of Search .................. 320/13, 14, 39, 320/40; 307/10.7

[56] References Cited

U.S. PATENT DOCUMENTS

| | | | |
|---|---|---|---|
| 3,800,207 | 3/1974 | Kott | 320/13 |
| 4,704,542 | 11/1987 | Hwang | 320/13 X |
| 5,177,426 | 1/1993 | Nakanishi et al. | 320/13 |
| 5,179,337 | 1/1993 | Staarman et al. | 320/13 |

FOREIGN PATENT DOCUMENTS

| | | | |
|---|---|---|---|
| 2732794 | 2/1979 | Germany | 320/13 |
| 4-33271 | 2/1992 | Japan . | |

Primary Examiner—Peter S. Wong
Assistant Examiner—Patrick B. Law
Attorney, Agent, or Firm—Wenderoth, Lind & Ponack

[57] ABSTRACT

A circuit effectively prevents excessive discharge of a rechargeable battery that is either detachable from, or internal to an electrical apparatus. The circuit has a battery voltage detector, a comparitor to compare the battery voltage with a reference voltage, and a controller to cut-off power drain from a discharged battery when its voltage drops below the reference voltage. The discharged battery is electrically cut-off from both the load and the comparitor.

12 Claims, 1 Drawing Sheet

CIRCUIT TO PREVENT EXCESSIVE RECHARGEABLE BATTERY DISCHARGE

BACKGROUND OF THE INVENTION

This invention relates to a circuit to prevent excessive discharge of a rechargeable battery which is detachable or permanently housed within an electrical apparatus.

If a rechargeable battery (which can be used repeatedly by recharging) is discharged to a point where the battery voltage drops below a given voltage, its performance will be degraded and battery lifetime will in turn be significantly shortened. To prevent excessive discharge of a rechargeable battery, methods have been employed that detect battery voltage and cut-off battery discharge when that voltage drops below a given value. For example, according to Japanese Patent Disclosure No. 4-33271, issued Feb. 4, 1992, a switching device is connected in series with the rechargeable battery and that switching device is turned off to cut-off battery discharge when battery voltage drops below a given value.

In this same disclosure, the switching device is maintained in the off state until the battery reaches a voltage slightly higher than the previously mentioned given value. This system then turns the switching device on to re-establish battery discharge when the slightly higher voltage is reached. In other words, the system has a hysteresis characteristic between the discharge cut-off voltage and the discharge re-start voltage which can be obtained, for example, by using a Schmitt trigger circuit.

The use of hysteresis between the discharge cut-off and re-start voltages described above prevents switching device chattering (intermittent connection due to repeated on–off switching) during self-recovery of the battery voltage after discharge cut-off. However, setting the hysteresis width between the discharge cut-off voltage and the re-start voltage to prevent chattering is difficult.

If the hysteresis width is too wide, rechargeable battery discharge is not possible until the battery is considerably charged. On the other hand, if the hysteresis width is too narrow, switching device chattering cannot prevented.

Further, because of the necessity to detect the re-start voltage after cutting off battery discharge, the discharge control circuit including the Schmitt trigger must remain activated. As a result, discharge control circuit current drain on the rechargeable battery can lead to excessive battery discharge.

It is thus an object of the present invention to reliably prevent excessive rechargeable battery discharge with a simple system.

SUMMARY OF THE INVENTION

The circuit to prevent excessive rechargeable battery discharge of this invention is a circuit that protects a rechargeable battery, which is mounted on an electrical apparatus and drives a load, from over-discharge. The circuit to prevent excessive discharge is provided with a voltage detection means to measure rechargeable battery voltage, a comparison means powered by the rechargeable battery to compare battery voltage with a reference voltage and issue a detection signal when the battery voltage drops below the reference voltage, and a control means to cut-off power from the rechargeable battery to the load and the comparison means in response to the detection signal.

In the circuit of this invention, when the rechargeable battery voltage is greater than the reference voltage, power is supplied to the load, power is supplied to the comparison means to compare battery and reference voltages, and battery discharge is controlled to avoid over-discharge. When rechargeable battery voltage drops below the reference voltage, the supply of power to both the load and the comparison means is stopped to reliably prevent excessive discharge of the rechargeable battery.

DETAILED DESCRIPTION OF THE INVENTION

Figure 1:
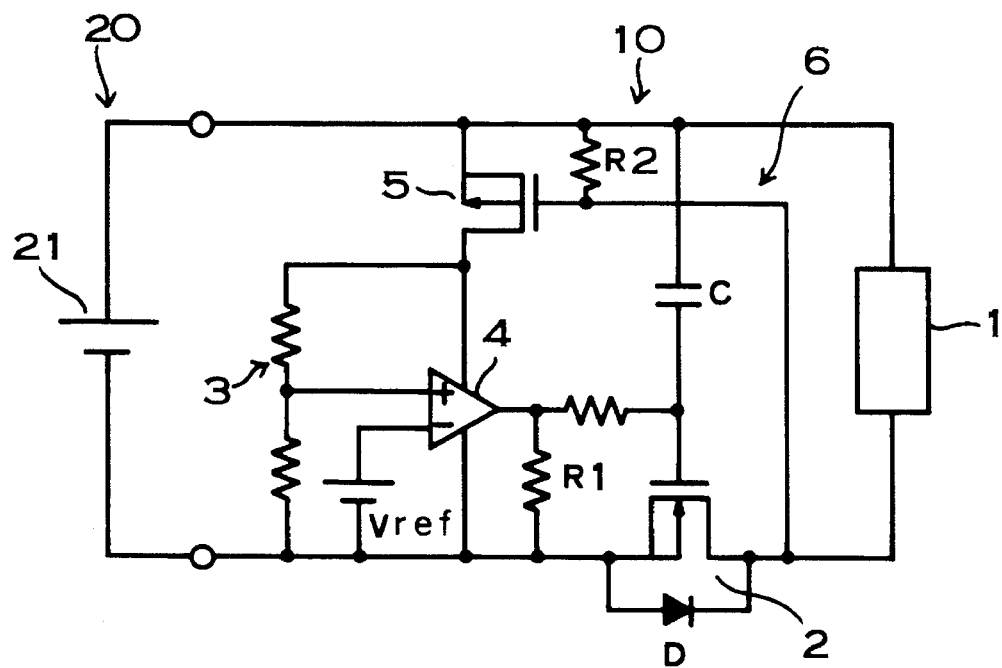
FIG. 1 is a circuit diagram showing an embodiment of the present invention.

Turning to FIG. 1 a circuit diagram of an embodiment of the present invention is shown. In this figure, 10 is an electrical apparatus such as a portable communications device and 20 is a battery pack containing a rechargeable battery 21 such as a lithium ion battery. The battery pack 20 can be readily attached to, and detached from the electrical apparatus 10.

In the electrical apparatus 10, 1 is a load driven by the rechargeable battery 21 and 2 is a first switch disposed between the rechargeable battery 21 and the load 1. The first switch 2 is an n-channel MOSFET (Metal Oxide Semiconductor Field Effect Transistor) with the source connected to the negative terminal of the rechargeable battery 21, and D is a parasitic diode associated with the MOSFET. Part number 3 is a voltage detection means which is made up of two series connected voltage dividing resistors that measure the voltage of the rechargeable battery 21 within the attached battery pack 20. Part number 4 is a comparison means which is a comparator that compares the voltage of the rechargeable battery 21 with a reference voltage Vref (for example, Vref=2.3 V when the rechargeable battery 21 is a lithium ion battery) and issues a detection signal to the gate of the first switch 2 when the battery voltage drops below the reference voltage Vref. Part number 5 is a second switch provided between the rechargeable battery 21 and the voltage detection means 3 and comparator 4 parallel circuit. The second switch 5 is a p-channel MOSFET with the gate connected to the drain side of the first switch 2. Part number 6 is a control means comprised of the previously mentioned first switch 2 and second switch 5. In addition, the control means 6 is also provided with a capacitor C connected between the positive terminal of the rechargeable battery 21 and the gate of the first switch 2, a pull-down resistor R1 connected between the negative terminal of the rechargeable battery 21 and the output terminal of the comparator 4, and a pull-up resistor R2 connected between the positive terminal of the rechargeable battery 21 and the gate of the second switch 5. The control means 6 controls the on–off state of the first switch 2 and the second switch 5 in response to the previously mentioned detection signal.

In the circuit to prevent excessive rechargeable battery discharge with this circuit structure, when a sufficiently charged battery pack 20 is attached to the electrical apparatus 10, the control means 6 detects battery attachment and turns the first switch 2 and the second switch 5 on. Specifically, when the battery pack 20 is attached to the electrical apparatus 10, capacitor C is charged making the gate voltage of the first switch 2 higher than the source voltage to turn on the first switch 2. Accompanying this, the second switch 5 is also turned on.

Consequently, power is supplied from the rechargeable battery 21 to drive the load 1. In addition, power is also supplied from the rechargeable battery 21 to the comparator 4 while battery voltage is measured by the voltage detection means 3. The comparator 4 compares rechargeable battery 21 voltage measured by the voltage detection means 3 with the reference voltage Vref. At this point, since the rechargeable battery 21 voltage is greater than the reference voltage Vref, comparator 4 output is a high level maintaining the first switch 2 in the on state.

Subsequently, the rechargeable battery 21 voltage drops below the reference voltage Vref due to battery discharge, and comparator 4 output becomes a low level turning the first switch 2 off. At the same time, the gate-source voltage of the second switch 5 goes to zero also turning the second switch 5 off. Consequently, power supply from the rechargeable battery 21 to the load 1 as well as to the comparator 4 is shut off. In other words, rechargeable battery 21 discharge is shut off and excessive rechargeable battery 21 discharge is effectively prevented (there is slight battery discharge due to capacitor C leakage current, but this discharge is negligible). This power cut-off state, where power is shut off from the rechargeable battery 21 to the load 1 and the comparator 4, is maintained until the battery pack 20 is removed from the electrical apparatus 10.

Figure 2:
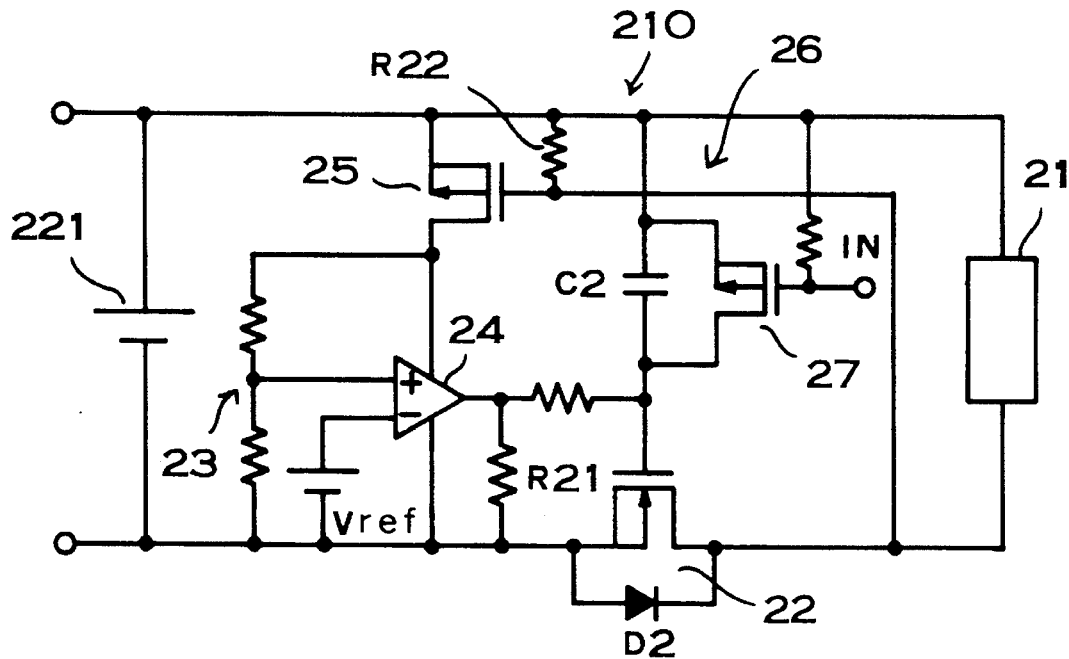
FIG. 2 is a circuit diagram showing another embodiment of the present invention.

Next, when the battery pack 20 is removed from the electrical apparatus 10, charge on the capacitor C is discharged through the pull-down resistor R1, the parasitic diode D, and the load 1. As a result, when the recharged battery pack 20 is attached to the electrical apparatus 10, the system is in a state that allows battery discharge according to the previously mentioned process. Turning to FIG. 2, a circuit diagram of another embodiment of the present invention is shown. In this embodiment, the rechargeable battery 221 is contained within the electrical apparatus 210. This embodiment differs from the previous embodiment in that a third switch 27, which is a MOSFET, is connected in parallel with the capacitor C2. This third switch 27 is configured such that after the rechargeable battery 221 is connected to a battery charger (not illustrated) and recharged, a reset pulse is applied to a reset input terminal IN connected to the gate to turn the MOSFET on for a given time interval.

In this system, when the rechargeable battery 221 is sufficiently charged, the first switch 22 and the second switch 25 are turned on, the load 21 is driven by the rechargeable battery 221, and the battery voltage is compared with the reference voltage Vref by the comparator 24 in the same manner as described for the previous embodiment. Further, when rechargeable battery 221 voltage drops below the reference voltage Vref, the first switch 22 and the second switch 25 are turned off to cut-off battery discharge.

Next, when a battery charger (not illustrated) is connected to the rechargeable battery 221 and recharging is completed, a reset pulse is applied to the reset input terminal IN. As a result, charge on capacitor C is discharged through the third switch 27 resetting the system to a state that allows rechargeable battery 221 discharge according to the previously mentioned process.

In the circuit to prevent excessive rechargeable battery discharge described above, rechargeable battery voltage is measured by the voltage detection means, the battery voltage and the reference voltage are compared, and a detection signal is issued from the battery powered comparison means when the rechargeable battery voltage drops below the reference voltage. Power to the load and the comparison means is controlled by the control means in response to this detection signal. When the rechargeable battery voltage drops below the reference voltage, power supply to both the load and the comparison means is shut off to reliably prevent excessive discharge of the rechargeable battery.

What is claimed is:

1. A circuit for preventing excessive rechargeable battery discharge of a rechargeable battery that attaches to an electrical apparatus and drives a load, comprising:

(a) a voltage detection means for measuring a voltage of the rechargeable battery;

(b) a comparison means powered BY the rechargeable battery for comparing the voltage measured by the voltage detection means with a reference voltage and for issuing a detection signal when the battery voltage drops below the reference voltage; and (c) a control means for shutting off power from the rechargeable Battery to the load and to the comparison means in response to the detection signal;

wherein the rechargeable battery is freely attachable to and detachable from the electrical apparatus, and wherein the control means automatically discontinues the shutting off of power when the rechargeable battery is detached from the electrical apparatus.

2. A circuit for preventing excessive rechargeable battery discharge as recited in claim 1, wherein the comparison means is a comparator that compares the battery voltage measured by the voltage detection means with the reference voltage and issues a detection signal when the battery voltage becomes less than or equal to a prescribed value.

3. A circuit for preventing excessive rechargeable battery discharge as recited in claim 1, wherein the control means is provided with a first switch connected between the rechargeable battery and the load and a second switch connected between the rechargeable battery and the comparison means.

4. A circuit for preventing excessive rechargeable battery discharge as recited in claim 3, wherein the first switch of the control means is an n-channel MOSFET having a source, a drain, and a gate.

5. A circuit for preventing excessive rechargeable battery discharge as recited in claim 4, wherein the source of the MOSFET, which is the first switch, is connected to a negative terminal of the rechargeable battery and the drain is connected to the load.

6. A circuit for preventing excessive rechargeable battery discharge as recited in claim 3, wherein the second switch of the control means is a p-channel MOSFET having a source, a drain, and a gate.

7. A circuit for preventing excessive rechargeable battery discharge as recited in claim 6, wherein the gate of the MOSFET, which is the second switch, is connected to the drain of the first switch.

8. A circuit for preventing excessive rechargeable battery discharge of a rechargeable battery contained in an electrical apparatus and drives a load, comprising:

(a) a voltage detection means for measuring a voltage of the rechargeable battery;

(b) a comparison means powered by the rechargeable battery for comparing the voltage measured by the voltage detection means with a reference voltage and for issuing a detection signal when the battery voltage drops below the reference voltage; and (c) a control means for shutting off power from the rechargeable battery to the load and to the comparison means in response to the detection signal;

wherein the rechargeable battery is contained within the electrical apparatus, and wherein the control means automatically discontinues the shutting off of power when the rechargeable battery is recharged.

9. A circuit for preventing excessive rechargeable battery discharge of a rechargeable battery that attaches to an electrical apparatus and drives a load, comprising:

(a) a voltage detection means for measuring a voltage of the rechargeable battery;

(b) a comparison means powered by the rechargeable battery for comparing the voltage measured by the voltage detection means with a reference voltage and for issuing a detection signal when the battery voltage drops below the reference voltage; and (c) a control means for shutting off power from the rechargeable battery to the load and to the comparison means in response to the detection signal;

wherein the control means is provided with a first switch connected between the rechargeable battery and the load and a second switch connected between the rechargeable battery and the comparison means;

wherein the first switch of the control means is an n-channel MOSFET having a source, a drain, and a gate;

wherein the control means is further provided with a capacitor, and the gate of the MOSFET, which is the first switch, is connected to a positive terminal of the rechargeable battery via the capacitor.

10. A circuit for preventing excessive rechargeable battery discharge as recited in claim 9, wherein the control means is provided with a third switch connected in parallel with the capacitor, which is connected to the gate of the first switch, to discharge the capacitor.

11. A circuit for preventing excessive rechargeable battery discharge as recited in claim 10, wherein the third switch is a MOSFET having a source, a drain, and a gate.

12. A circuit for preventing excessive rechargeable battery discharge as recited in claim 11, wherein the gate of the third switch is a reset input terminal for a resetting pulse.

* * * * *